United States Patent [19]
Hwang

[11] Patent Number: 5,747,977
[45] Date of Patent: May 5, 1998

[54] SWITCHING REGULATOR HAVING LOW POWER MODE RESPONSIVE TO LOAD POWER CONSUMPTION

[75] Inventor: Jeffrey H. Hwang, Saratoga, Calif.

[73] Assignee: Micro Linear Corporation, San Jose, Calif.

[21] Appl. No.: 917,205

[22] Filed: Aug. 25, 1997

Related U.S. Application Data

[63] Continuation of Ser. No. 413,249, Mar. 30, 1995, abandoned.

[51] Int. Cl.[6] ............................................................. G05F 1/56
[52] U.S. Cl. ............................ 323/284; 323/222; 323/283
[58] Field of Search ................................. 323/222, 282, 323/283, 284, 285, 286

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/283 |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,437,146 | 3/1984 | Carpenter | 363/21 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 323/285 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |

(List continued on next page.)

FOREIGN PATENT DOCUMENTS

| | | | |
|---|---|---|---|
| 60-22490 | 2/1985 | Japan | H02P 5/41 |

OTHER PUBLICATIONS

"Nonlinear-Carrier Control for High Power Factor Rectifiers Based on Flyback, Cuk, or Sepic Converters," R. Zane and D. Maksimovic, Applied Power Electronics Conf., pp. 814–820, 1996.

"ML4821EVAL Average Current PFC Controller Evaluation Kit," Micro Linear Corporation, pp. 6–127, Jul. 1992.

"ML4821 Power Factor Controller," Micro Linear Corporation, pp. 1–12, May 1997.

(List continued on next page.)

*Primary Examiner*—Jeffrey L. Sterrett
*Attorney, Agent, or Firm*—Haverstock & Owens LLP

[57] ABSTRACT

A switching mode power converter monitors the level of power supplied to a load device. The operation of a switch is controlled and used to draw power from an input source and supply power to the load device. During normal operation, the operation of the switch is triggered on every clock pulse by a triggering pulse. The duty cycle of the triggering pulse is controlled by a pulse width modulation circuit which monitors the level of power being supplied to the load device. When the power being supplied to the load falls to a predetermined light load threshold level, representing that the load device is either in a standby mode or a period of light use, the switching mode power converter will reduce the amount of power being drawn from the input source by disabling the triggering pulse for an appropriate number of pulses of the clock signal. The number of pulses skipped will depend on an amount of power being supplied to the load device and an amount of voltage stored across the capacitor. The triggering pulse is re-enabled once the power being supplied to the load device rises above the light load threshold level or the voltage stored across the capacitor falls to a low threshold level. In this manner, during periods when the load device is not operating in the continuous conduction mode, the switching mode power converter will attempt to minimize the amount of power being drawn from the input source.

9 Claims, 3 Drawing Sheets

U.S. PATENT DOCUMENTS

| | | | |
|---|---|---|---|
| 4,761,725 | 8/1988 | Henze | 323/283 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi et al. | 323/285 |
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,440,473 | 8/1995 | Ishii et al. | 363/21 |
| 5,450,000 | 9/1995 | Olsen et al. | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller | 323/222 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |

OTHER PUBLICATIONS

"Application Note 30," Linear Technology, pp. AN30–AN42, (no date).

"ML4880 Portable PC/PCMCIA Power Controller," Micro Linear Corporation, p. 1, Oct. 1995 (Preliminary).

"Nonlinear–Carrier Control for High Power Factor Boost Rectifiers," D. Maksimovic, Y. Jang, R. Erikson, Applied Power Electronics Conf., pp. 635–641, Mar. 1995.

"ML4863 High Efficiency Flyback Controller", Micro Linear Corporation, Feb. 1995.

"ML4863EVAL User's Guide High Efficiency Flyback Controller", Micro Linear Corporation, Feb. 1995.

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Analysis of the Flyback Converter Operating in Current–Mode Pulse–Frequency Modulation", Urs Mader and Kit Sum, High Frequency Power Conversion, Apr. 17, 1994.

"Step Up/Step Down Converters Power Small Portable Systems", Bruce D. Moore, EDN, pp. 79–84, Feb. 3, 1994.

"ML4861 Low Voltage Boost Regulator", Micro Linear Corporation, Jun. 1993.

"11. Variable Frequency Converters", K. Kit Sum, pp. 96–97, 134–135, Sep. 1993.

"3.3 V/5V/Adjustable Output, Step–Up, DC–DC Converters", Maxim Integrated Products, pp. 1–8, Jun. 1993.

"ML4821 Power Factor Controller," Micro Linear Corporation, Jun. 1992.

"Application Note 16—Theory and Application of the ML4821 Average Current Mode PFC Controller," Micro Linear Corporation, Jan. 1992.

"Small–Signal High–Frequency Analysis Of The Free–Running Current–Mode–Controlled Converter", Richard Redl, pp. 897–906, IEEE, Dec. 1991.

"Low–Voltage–Input, 3V/3.3V/5V/Adjustable–Output, Step–Up DC–DC Converters", Maxim Integrated Products, pp. 4–189 to 4–191 Mar. 1989.

"LT1073 Micropower DC–DC Converter Adjustable and Fixed 5V, 12V", Linear Technology, pp. 4–174 to 4–189, 4–192, Mar. 1992.

"System–Engineered Portable Power Supplies Marry Improved Efficiency And Lower Cost", Bruce D. Moore, Maxim Integrated Products Mar. 1995.

"ML4823 High Frequency Power Supply Controller," Micro Linear Corporation, Dec. 1994.

"CD 54/74 HC 4046A Technical Data," RCA., Oct. 1994.

"ML4863 High Efficiency Battery Pack Converter (Preliminary)", Micro Linear Corporation, Jun. 1994.

SWITCHING REGULATOR HAVING LOW POWER MODE RESPONSIVE TO LOAD POWER CONSUMPTION

This is a Continuation of application Ser. No. 08/413, 249, filed on Mar. 30, 1997 now abandoned.

FIELD OF THE INVENTION

The present invention relates to the field of switching mode power converters. More particularly, the present invention relates to the field of minimizing the power drawn from an input source by a switching mode power converter.

BACKGROUND OF THE INVENTION

For switching mode power converters the output voltage is controlled by an electronic circuit which measures a level of electric current within the circuit, compares that measured level to a predetermined desired level, and develops a response to that measurement elsewhere in the circuit in order to more accurately achieve the desired level. A switching mode power converter which uses a trailing edge modulation control scheme is illustrated in FIG. 1. The input voltage VIN is coupled to a first terminal of the inductor L1. A second terminal of the inductor L1 is coupled to a first terminal of the switch SW1 and to the anode of the diode SW2. A capacitor C1 is coupled between the cathode of the diode SW2 and a second terminal of the switch SW1. A load RL is coupled across the capacitor C1. A potentiometer PT1 is coupled across the load RL and provides a negative input to a voltage error amplifier 10. A reference voltage REF is coupled to the positive input of the error amplifier 10. The output VEAO of the voltage error amplifier 10 is coupled as the positive input of a modulating comparator 14. The negative input of the modulating comparator 14 is coupled to receive the ramp output of an oscillator 12. The output of the modulating comparator 14 is coupled as the reset input R of a flip flop 16. The input D of the flip flop 16 is coupled to the inverted output Q̄ of the flip flop 16. A clock input CLK of the flip flop 16 is coupled to the clock output of the oscillator 12. The output Q of the flip flop 16 is coupled to control the operation of the switch SW1.

The output voltage VOUT is established by integrating the inductor current I1 in the LC filter network. This integrated current is supplied to the load circuit as the converted output voltage VOUT. In order to establish the proper output voltage from a given input voltage, the input voltage VIN is switched in and out of the circuit by the switch SW1. The resulting oscillating signal is integrated in the LC network to form the desired output voltage VOUT. If the input voltage VIN changes or varies over time, the frequency at which the switch SW1 is opened and closed can also be varied in order to maintain the desired output voltage VOUT.

Pulse width modulation (PWM) is a technique used to maintain a constant output voltage VOUT when the input voltage does not remain constant and varies over time. By changing the frequency at which the switch SW1 is opened and closed, as the input voltage changes, the output voltage VOUT can be maintained at a constant level as desired. The inductor current I1 is stored as a voltage level on the plates of the capacitor C1 when the switch SW1 is open. Because of its parallel connection to the output of the circuit, the voltage across the capacitor C1 is equivalent to the output voltage VOUT and the voltage across the potentiometer PT1. A predetermined fraction of that voltage is measured from the potentiometer PT1 forming the voltage VEA which is input into the negative terminal of the voltage error amplifier 10 and is compared to the reference voltage REF. This comparison determines how close the actual output voltage VOUT is to the desired output voltage.

Conventional pulse width modulation techniques use the trailing edge of the clock signal, so that the switch will turn on right after the trailing edge of the system clock. FIG. 1 illustrates such a trailing edge modulation control scheme. The leading edge of the clock signal may also be used for pulse width modulation. In order to implement a leading edge modulation control scheme the inputs to the error amplifier 10 must be reversed: the voltage VEA from the potentiometer PT1 is coupled to the positive terminal of the voltage error amplifier 10 and the reference voltage REF is coupled to the negative terminal of the voltage error amplifier 10.

FIGS. 2, 3 and 4 show corresponding voltage waveforms with respect to time of different voltage levels at different points within the switch control circuitry 31 of the trailing edge scheme. The time axis for the FIGS. 2, 3 and 4 has been drawn to correspond in all three figures. FIG. 2 illustrates the voltage levels with respect to time of the error amplifier output VEAO and the modulating ramp output of the oscillator 12. FIG. 3 illustrates the voltage level of the switch SW1 with respect to time. The switch SW1 is at a high voltage level when it is "on" or closed. The switch SW1 is at a low voltage level when it is "off" or open. FIG. 4 illustrates the clock impulses with respect to time of the clock output of the oscillator 12.

The switch SW1 will turn on after the trailing edge of the system clock. Once the switch SW1 is on, the modulating comparator 14 then compares the error amplifier output voltage VEAO and the modulating ramp. When the modulating ramp reaches the error amplifier output voltage, the output of the modulating comparator 14 will fall to a logical low voltage level. Because of the inverter coupled to the input, the input R of the flip flop 16 will then rise to a logical high voltage level thereby resetting the output Q of the flip flop 16 to a logical low voltage level and turning the switch SW1 off. When the switch SW1 is on, the inductor current IL will ramp up.

The effective duty cycle of the trailing edge modulation is determined during the on time of the switch. The on time of the switch is determined by the level of the error amplifier output voltage VEAO and the level of the modulating ramp. As the load is increased and the level of power supplied to the load increases, the error amplifier output voltage VEAO will increase and the duty cycle of the switch will also increase. Correspondingly, as the load is decreased and the level of power supplied to the load decreases, the error amplifier output voltage VEAO will decrease and the duty cycle of the switch will also decrease. Thus, the level of power supplied to the load is monitored and compared with an expected reference level. It is the difference of this comparison which is used to determine the duty cycle of the switch SW1.

FIG. 1 illustrates a typical trailing edge control scheme using a single boost power converter stage. As the input voltage VIN varies over time, the duty cycle or time that the switch SW1 is on will vary in order to maintain a constant output voltage VOUT.

Efficient use of power is a desirable characteristic for all electronic systems. Minimizing the power drawn from a line voltage source by a switching mode power converter will allow a user to realize significant savings in the cost of power consumption. Power efficiency is also desirable for systems which draw power from a battery source having a finite lifetime. Efficient use of power from a battery source will enable the user of a battery powered device such as a cellular phone or a portable computer to use the device for a longer period of time before it is necessary to replace or recharge a battery supplying power to the device.

SUMMARY OF THE INVENTION

A switching mode power converter monitors the level of power supplied to a load device. The operation of a switch is controlled and used to draw power from an input source and supply power to the load device. During normal operation, the operation of the switch is triggered on every clock pulse by a triggering pulse. The duty cycle of the triggering pulse is controlled by a pulse width modulation circuit which monitors the level of power being supplied to the load device. When the power being supplied to the load falls to a predetermined light load threshold level, representing that the load device is either in a standby mode or a period of light use, the switching mode power converter will reduce the amount of power being drawn from the input source by disabling the triggering pulse for an appropriate number of pulses of the clock signal. The number of pulses skipped will depend on an amount of power being supplied to the load device and an amount of voltage stored across the capacitor. The triggering pulse is re-enabled once the power being supplied to the load device rises above the light load threshold level or the voltage stored across the capacitor falls to a low threshold level. In this manner, during periods when the load device is not operating in the continuous conduction mode, the switching mode power converter will attempt to minimize the amount of power being drawn from the input source.

DETAILED DESCRIPTION OF THE PREFERRED EMBODIMENT

Without proper controls, when a load device enters a standby mode or a period of light or no use, a switching mode power converter of the prior art, supplying power to the load device, will maintain normal operation, thereby drawing unnecessary amounts of power from the input source. During a light load period, when the load device is in a standby mode or a period of light use, the load device will require a certain minimum level of power in order to maintain operations and remain ready to resume normal operation as required. In order to minimize the amount of power drawn from the input source, the switching mode power converter of the present invention monitors the level of power being supplied to the load device and will disable the switch used to draw power from the input source for an appropriate number of clock pulses during a light load period.

In order to minimize the amount of power drawn from the input source during a light load period, a switching mode power converter must have the ability to determine when the load device is in a standby mode or a period of light or no use. In one embodiment, the switching mode power converter will rely on the load device to notify it when it has entered a light load period. However, this embodiment requires an extra input pin on the switching mode power converter. In another embodiment, the switching mode power converter will monitor the current being delivered to the load in order to determine when the load device has entered a light load period. However, this embodiment requires a change of the architecture within the switching mode power converter.

In the preferred embodiment of the present invention, the already existing feedback from the potentiometer PT1 is used to monitor the power being supplied to the load device. In this embodiment, only the necessary logic circuitry must be added to the switching mode power converter. During normal operation, when the switching mode power converter is not in a light load period, the operation of the switching mode power converter of the present invention is the same as that described above for the switching mode power converter illustrated in FIG. 1. During a light load period the triggering pulse which controls the switch SW1 is disabled for an appropriate number of clock pulses between triggering pulses. The added logic circuitry determines when the load device is in a light load period by comparing the error amplifier output voltage VEAO to a predetermined light load threshold level. When the error amplifier output voltage VEAO falls below the predetermined light load threshold level and the voltage across the capacitor is above a high capacitor threshold level, the switch triggering pulse is disabled. The switch triggering pulse is then re-enabled when either the error amplifier output voltage VEAO rises above the predetermined light load threshold level or the voltage across the capacitor falls below a low capacitor threshold level.

Figure 5:
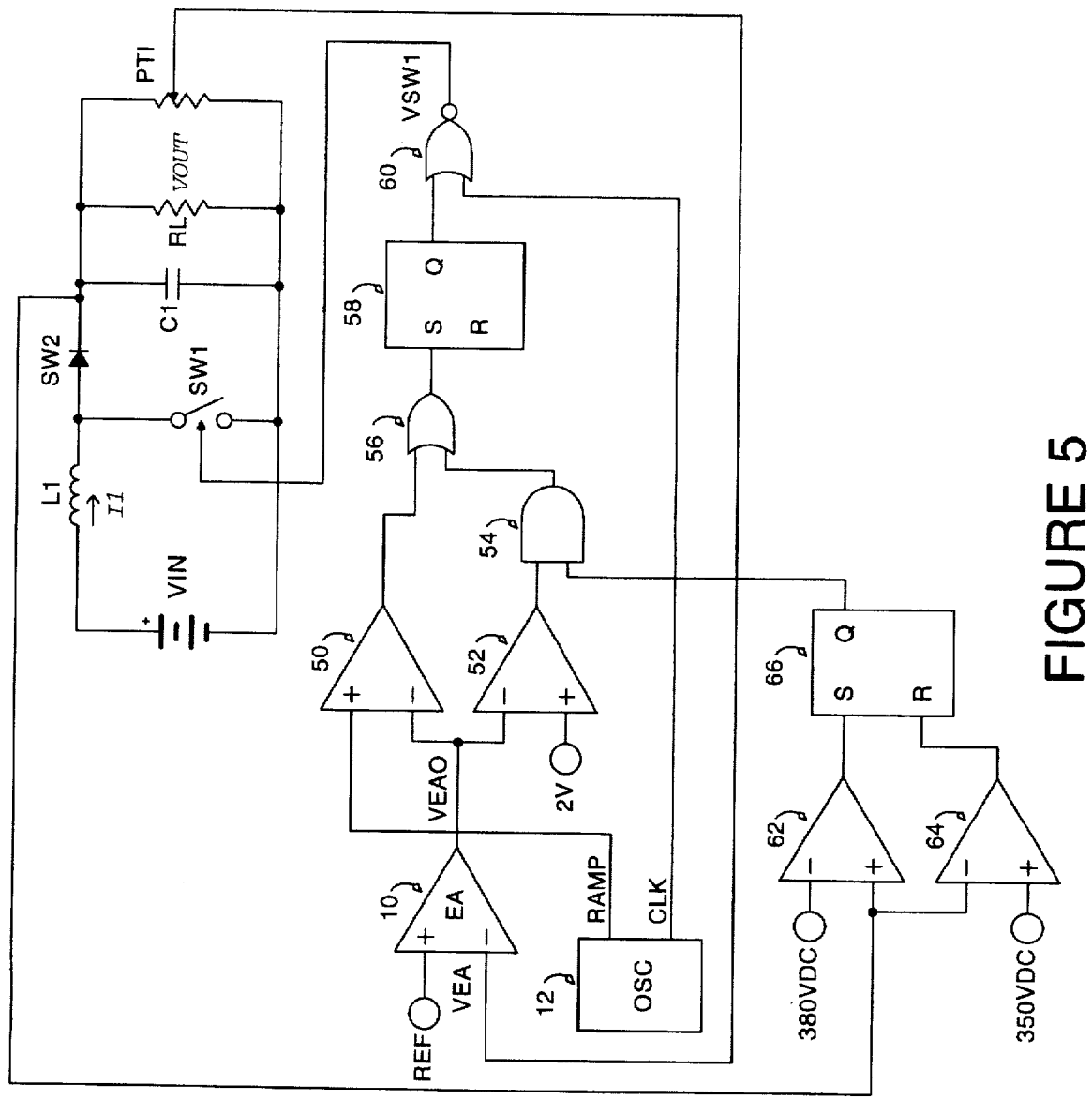
FIG. 5 illustrates a block diagram schematic of a pulse width regulating low power switching mode power converter according to the present invention.

A block diagram schematic of a pulse width regulating low power switching mode power converter, according to the present invention, is illustrated in FIG. 5. The switching mode power converter illustrated in FIG. 5 is identical to the circuit illustrated in FIG. 1 except for the addition of a light load monitoring and triggering pulse disabling logic circuitry. A first terminal of the input voltage source VIN is coupled to a first terminal of an inductor L1. A second terminal of the input voltage source VIN is coupled to ground. A second terminal of the inductor L1 is coupled to a first terminal of the switch SW1 and to an anode of a diode SW2. A second terminal of the switch SW1 is coupled to ground. A cathode of the diode SW2 is coupled to a first terminal of the capacitor C1. The first terminal of the capacitor C1 is also coupled to a positive input of a comparator 62 and to a negative input of a comparator 64. A second terminal of the capacitor C1 is coupled to ground. A load device RL is coupled across the capacitor C1. A potentiometer PT1 is coupled across the load RL and as a negative input to a voltage error amplifier 10. A reference voltage REF is coupled to a positive input of the error amplifier 10. An output VEAO of the voltage error amplifier 10 is coupled as a negative input to the comparators 50 and 52. A positive input of the comparator 50 is coupled to receive the ramp output of the oscillator 12. A positive input of the comparator 50 is coupled to receive a light load threshold voltage, which in the preferred embodiment is two volts.

An output of the comparator 50 is coupled as an input to a logical OR gate 56. An output of the comparator 52 is coupled as an input to a logical AND gate 54. A high capacitor threshold voltage is coupled to a negative input of a comparator 62. In the preferred embodiment of the present invention, the high capacitor threshold voltage is 380 VDC. An output of the comparator 62 is coupled as an S input to a flip flop 66. A low capacitor threshold voltage is coupled to a positive input of a comparator 64. In the preferred embodiment of the present invention, the low capacitor threshold voltage is 350 VDC. An output of the comparator 64 is coupled as an R input to the flip flop 66. A Q output of the flip flop 66 is coupled as an input to a logical AND gate 54. An output of the logical AND gate 54 is coupled as an input to a logical OR gate 56. An output of the logical OR gate 56 is coupled as an S input to a flip flop 58. A clock output of the oscillator 12 is coupled as an R input to the flip flop 58 and as an input to a logical NOR gate 60. A Q output of the flip flop 58 is coupled as an input to the logical NOR gate 60. An output VSW1 of the logical NOR gate 60 is the triggering pulse voltage and is coupled to control the operation of the switch SW1.

The level of power supplied to the load is monitored during the operation of the switching mode power converter. When the power drawn by the load falls to the light load threshold level, the switching mode power converter will disable the triggering pulse for an appropriate number of clock pulses, depending on the level of power supplied to the load RL. The triggering pulse which controls the operation of the switch SW1, is initiated by a clock pulse on the clock output from the oscillator 12. As explained above, power is drawn from the input source VIN when the switch SW1 is in the on or closed position. By disabling the triggering pulse for an appropriate number of clock pulses during a light load period, the amount of power drawn from the input source VIN is minimized.

In the switching mode power converter of the present invention, a portion of the voltage across the load device RL is measured by the potentiometer PT1 and input into the error amplifier 10. The error amplifier 10 then compares the voltage output from the potentiometer PT1 with the reference voltage REF and will output the difference between the two inputs multiplied by the gain of the error amplifier 10. The output VEAO from the error amplifier 10 is compared to the modulating ramp reference signal by the comparator 50 and to the light load threshold level by the comparator 52.

The light load threshold level may be programmed appropriately for any specific system. In the preferred embodiment of the present invention, the light load threshold level is set equal to two volts. When the output of the error amplifier 10 falls below this light load threshold level, it signals that the load device RL is not in the continuous conduction mode and is not drawing the amount of power which it would during normal operation.

Figure 1:
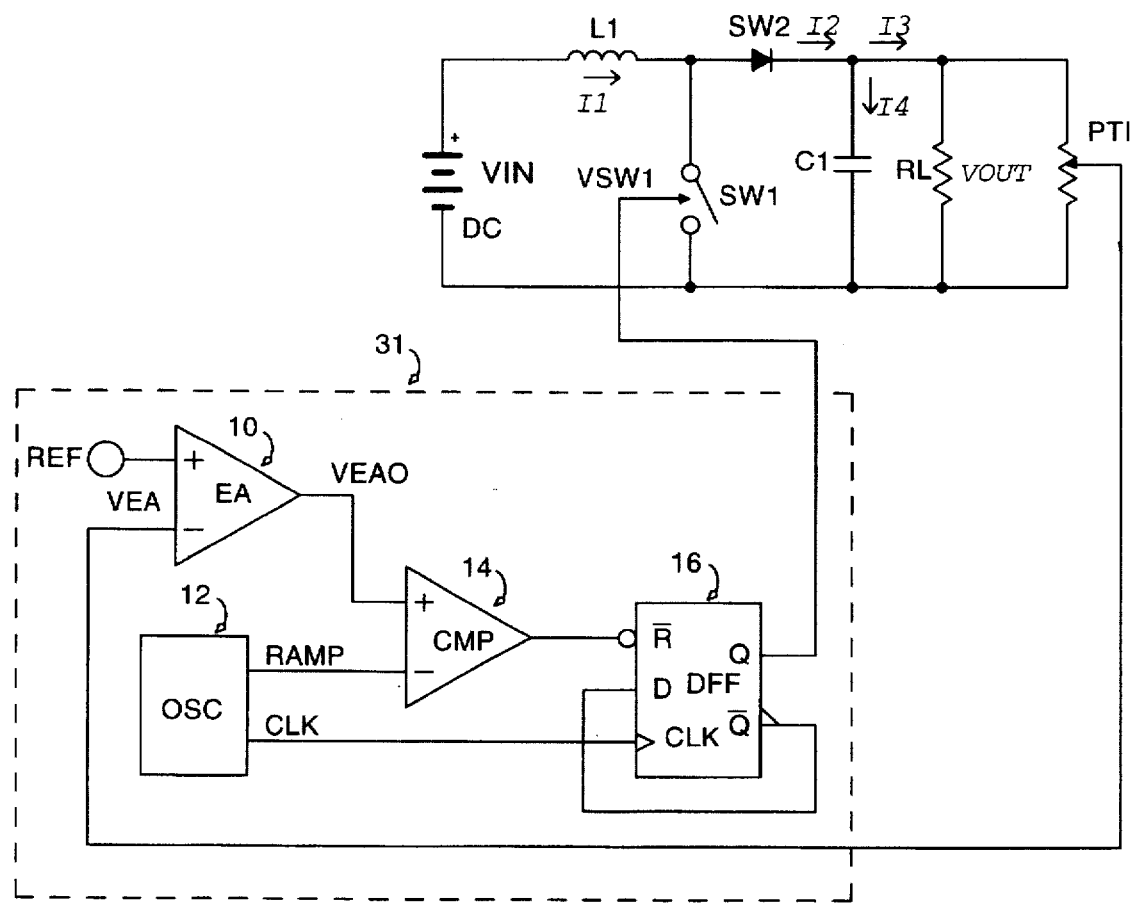
FIG. 1 illustrates a schematic diagram of a switching mode power converter of the prior art which uses a trailing edge modulation control scheme.
Figure 2:
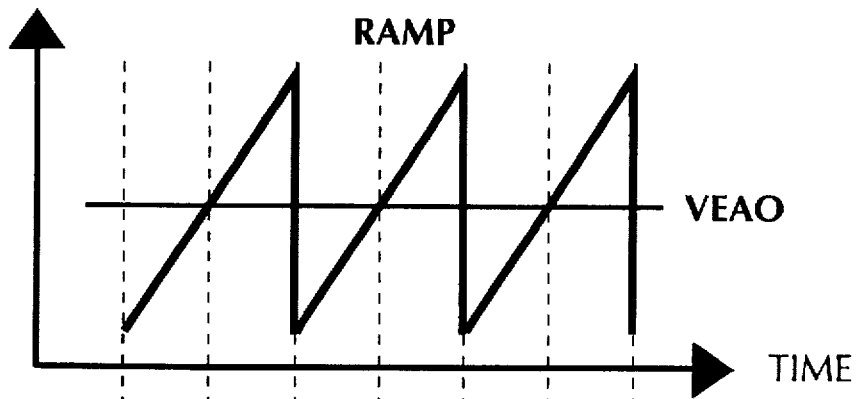
FIG. 2 illustrates the voltage levels with respect to time of the error amplifier output and the ramp output of the oscillator for the trailing edge modulation circuit of FIG. 1.
Figure 3:
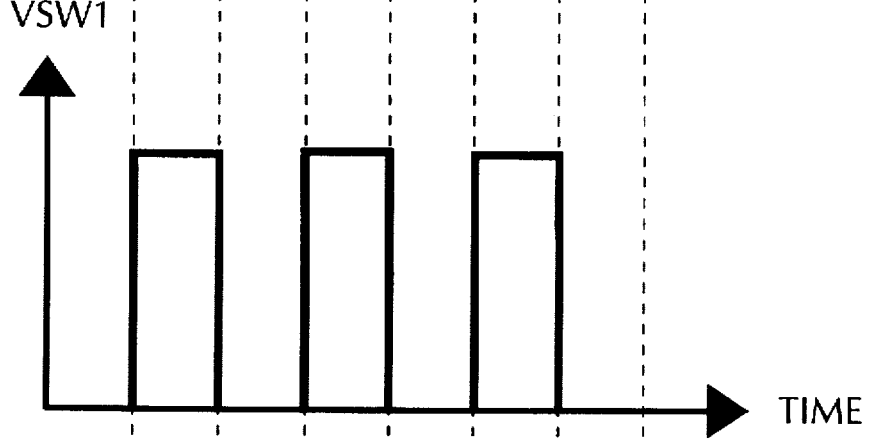
FIG. 3 illustrates the voltage level of the switch SW1 with respect to time.
Figure 4:
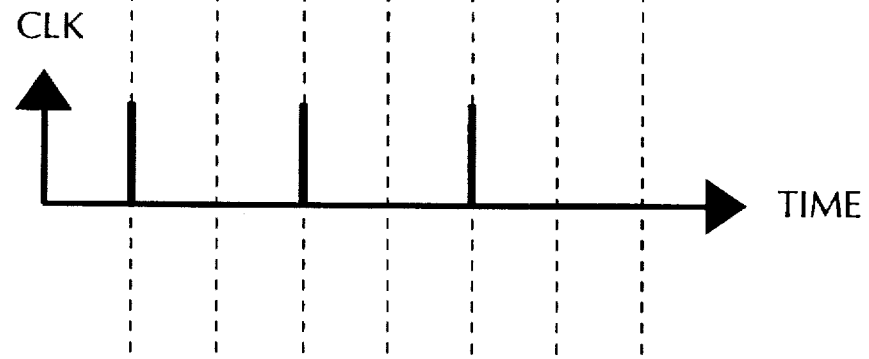
FIG. 4 illustrates the clock impulses with respect to time of the clock output of the oscillator.

During normal operation the switching mode power converter according to the present invention operates just as the switching mode power converter illustrated in FIG. 1 and described above. The triggering pulse voltage VSW1 is initiated at the trailing edge of the clock signal and rises to a logical high voltage level, thereby turning the switch SW1 on. The triggering pulse voltage VSW1 will then remain at a logical high voltage level until the modulating ramp signal falls below the output VEAO of the error amplifier 10. When the modulating ramp signal falls below the output VEAO of the error amplifier 10, the triggering pulse voltage VSW1 will then fall to a logical low voltage level causing the switch SW1 to turn off. The clock signal will initiate a triggering pulse every clock period during normal operation. The duty cycle of the triggering pulse voltage VSW1 and thereby of the switch is determined by the level of the output VEAO of the error amplifier 10 as compared to the level of the modulating ramp signal.

During a light load period, when the output VEAO of the error amplifier 10 is below the light load threshold level and the voltage across the capacitor C1 is above the high capacitor threshold level, the output of the logical AND gate 54 is at a logical high voltage level. As long as the output of the logical AND gate 54 is at a logical high voltage level, the output of the logical OR gate 56 and the S input of the flip flop 58 will be at a logical high voltage level. Thus, when the output of the logical AND gate 54 is at a logical high voltage level, because the S input of the flip flop 58 remains at a logical high voltage level, the clock signal output from the oscillator 12 and the output Q of the flip flop 58 are always at opposite logical voltage levels. Because both the output Q of the flip flop 58 and the clock signal are both input to the logical NOR gate 60 and are always at opposite logical voltage levels during a light load period, the triggering pulse voltage VSW1 will remain at a logical low voltage level and will be effectively disabled when the output of the logical AND gate 54 is at a logical high voltage level.

The logical AND gate 54 monitors the operation of the switching mode power converter and determines when the load device is in a light load period and when the triggering pulse voltage VSW1 should be disabled. When the triggering pulse voltage VSW1 should be disabled, the output of the logical AND gate 54 is at a logical high voltage level. Thus, in order to disable the triggering pulse voltage VSW1 both inputs of the logical AND gate 54 must be at a logical high voltage level. The output of the logical AND gate 54 is at a logical high voltage level when the output VEAO of the error amplifier 10 is below the light load threshold level, signalling that the load device is in a standby or limited use mode, and the voltage across the capacitor C1 is at least the high capacitor threshold level, 380 VDC. When both of these conditions are true, the triggering pulse voltage VSW1 is disabled for a number of clock pulses until either the output VEAO of the error amplifier 10 rises above the light load threshold level or the voltage across the capacitor C1 falls below the low capacitor threshold level, 350 VDC.

The output Q of the flip flop 66 will rise to a logical high voltage level when the voltage across the capacitor C1 is above the high capacitor threshold voltage 380 VDC. The output Q will remain at a logical high voltage level until the voltage across the capacitor C1 falls below the low capacitor threshold voltage 350 VDC. Therefore, the triggering pulse voltage VSW1 will be re-enabled and normal operation will resume at the trailing edge of the next clock pulse after either the output VEAO of the error amplifier 10 rises above two volts or the voltage across the capacitor C1 falls below 350 VDC. As long as the load device remains in a light load mode this process will be repeated with the triggering pulse voltage VSW1 being disabled when the output VEAO of the error amplifier 10 is below the light load threshold value and the voltage across the capacitor C1 is above the high capacitor threshold voltage and being enabled at the trailing edge of the next clock pulse after either the voltage across the capacitor C1 falls below the low capacitor threshold voltage or the output VEAO of the error amplifier 10 rises above the light load threshold value. In this manner, during a light load period, the voltage across the capacitor C1, in the preferred embodiment, is charged up to 380 VDC and then is allowed to sag to 350 VDC before it is charged again. Therefore, the power drawn from the input source VIN is minimized during a light load period because the triggering pulse is disabled for one or more clock pulses until the voltage across the capacitor C1 falls to the low capacitor threshold voltage level or the output VEAO of the error amplifier 10 rises above the light load threshold voltage level. When the triggering pulse voltage VSW1 is disabled, the switch SW1 is not turned on and therefore no power is drawn from the input source VIN.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that different threshold values than those listed above may be used within a switching mode power converter according to the present invention. Also, as apparent to those skilled in the art, other appropriate means for determining when the load device is in a light load mode may be utilized.

I claim:

1. An apparatus for drawing power from an input source and supplying a voltage to a load device, comprising:
   a. means for drawing power from the input source comprising a switch for controlling charging of an inductor with a current and discharging the inductor;
   b. means for delivering a voltage to the load device wherein the voltage is formed by a storage device coupled to receive the current;
   c. means for forming an error signal coupled to the storage device, wherein the error signal is representative of a difference between a level of the voltage formed by the storage device and a desired voltage level;
   d. means for comparing the error signal to a periodic ramp signal having a fixed frequency for controlling a duty cycle of the switch, the means for comparing coupled to the means for forming;
   e. means for determining coupled to the load device for determining when the load device enters a light load period wherein the load device enters a light load period when the error signal falls below a light load threshold level; and
   f. means for temporarily disabling coupled to the means for determining and to the means for drawing power for temporarily disabling the means for drawing power when the load device enters a light load period.

2. The apparatus as claimed in claim 1 further comprising means for re-enabling coupled to the means for drawing power for re-enabling the means for drawing power when the error signal rises above the light load threshold level.

3. The apparatus as claimed in claim 2 wherein the means for temporarily disabling disables the means for drawing power when the voltage has exceed a high threshold level.

4. The apparatus as claimed in claim 3 wherein the means for re-enabling will also re-enable the means for drawing power when the stored amount of voltage falls below a low threshold level.

5. The apparatus as claimed in claim 4 wherein the load device is in a light load period during a stand by period or a period of light use.

6. A method of supplying power to a load device comprising the steps of:
   a. drawing power from an input source including alternately charging an inductor with a current and discharging the inductor into a storage device for forming a voltage;
   b. forming an error signal representative difference between the voltage and a desired voltage;
   c. delivering the voltage stored on the storage device to a load device;
   d. monitoring the voltage and the error signal;
   e. comparing the error signal to a ramp signal for controlling a duty cycle for alternately charging the inductor and discharging the inductor;
   f. disabling the step of drawing power from the input source when the error signal falls below a light load threshold level and the voltage stored by the storage device exceeds a high threshold level; and
   g. re-enabling the step of drawing power from the input source when either the error signal rises above the light load threshold level or the voltage stored by the storage device falls below a low threshold level.

7. The method as claimed in claim 6 wherein the light load threshold level is equal to two volts.

8. The method as claimed in claim 6 wherein the high threshold level is equal to 380 VDC.

9. The method as claimed in claim 6 wherein the low threshold level is equal to 350 VDC.

* * * * *

UNITED STATES PATENT AND TRADEMARK OFFICE
CERTIFICATE OF CORRECTION

PATENT NO.   :   5,747,977

DATED        :   May 5, 1998

INVENTOR(S)  :   Jeffrey Hwang

It is certified that error appears in the above-identified patent and that said Letters Patent is hereby correct as shown below:

In column 1, line 4 and 5, delete "This is a Continuation of application Ser. No. 08/413,249, filed on Mar. 30, 1997 now abandoned." and insert --This is a Continuation of application Ser. No. 08/413,249, filed on Mar. 30, 1995 now abandoned.--.

In column 4, line 63, delete "comparator 50" and insert --comparator 52--.

Signed and Sealed this

Eleventh Day of August 1998

Attest:

BRUCE LEHMAN

*Attesting Officer*      *Commissioner of Patents and Trademarks*